(12) United States Patent
Tanaka et al.

(10) Patent No.: US 12,500,263 B2
(45) Date of Patent: Dec. 16, 2025

(54) METHOD FOR PRODUCING OXYHALIDE

(71) Applicant: Panasonic Intellectual Property Management Co., Ltd., Osaka (JP)

(72) Inventors: Yoshiaki Tanaka, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 606 days.

(21) Appl. No.: 17/937,458

(22) Filed: Oct. 2, 2022

(65) Prior Publication Data

US 2023/0041243 A1 Feb. 9, 2023

Related U.S. Application Data

(63) Continuation of application No. PCT/JP2021/016247, filed on Apr. 22, 2021.

(30) Foreign Application Priority Data

Apr. 30, 2020 (JP) ................................. 2020-080651

(51) Int. Cl.
*H01M 10/0525* (2010.01)
*C01G 35/00* (2006.01)
*H01M 10/0562* (2010.01)

(52) U.S. Cl.
CPC ...... *H01M 10/0562* (2013.01); *C01G 35/006* (2013.01); *H01M 10/0525* (2013.01);
(Continued)

(58) Field of Classification Search
CPC ....... H01M 10/0525; H01M 2300/008; H01M 10/0562; H01M 2300/0071; C01G 35/006; C01P 2002/50; C01P 2006/40
(Continued)

(56) References Cited

U.S. PATENT DOCUMENTS 4,108,970 A * 8/1978 Ballman .............. C01G 33/006
423/594.8
11,581,569 B2 * 2/2023 Yushin ................ H01M 10/617
(Continued)

FOREIGN PATENT DOCUMENTS

WO 2018/025582 2/2018
WO 2020/137155 A1 7/2020
(Continued)

OTHER PUBLICATIONS

The EPC Office Action dated Nov. 24, 2023 for the related European Patent Application No. 21797902.0.
(Continued)

*Primary Examiner* — Cam N. Nguyen
(74) *Attorney, Agent, or Firm* — GREENBLUM & BERNSTEIN, P.L.C.

(57) ABSTRACT

A producing method according to the present disclosure includes heat-treating a material mixture at higher than or equal to 150° C. and lower than or equal to 450° C., wherein the material mixture contains $MX_5$ and at least one selected from the group consisting of $Li_2O_2$, $Li_2O$, and LiOH, M is at least one selected from the group consisting of Ta and Nb, and X is at least one selected from the group consisting of Cl and Br.

13 Claims, 2 Drawing Sheets

(52) U.S. Cl.
CPC ...... *C01P 2002/50* (2013.01); *C01P 2006/40* (2013.01); *H01M 2300/0071* (2013.01); *H01M 2300/008* (2013.01)

(58) Field of Classification Search
USPC .......................................................... 423/463
See application file for complete search history.

(56) References Cited

U.S. PATENT DOCUMENTS

| | | | |
|---|---|---|---|
| 11,821,080 B2* | 11/2023 | Liu ........................ | C23C 16/08 |
| 12,068,453 B2* | 8/2024 | Tanaka ................... | C01G 35/00 |
| 12,080,846 B2* | 9/2024 | Tanaka ................ | H01M 10/052 |
| 2019/0088995 A1 | 3/2019 | Asano et al. | |
| 2021/0249683 A1 | 8/2021 | Tanaka et al. | |
| 2022/0209290 A1 | 6/2022 | Takeuchi et al. | |
| 2023/0055771 A1 | 2/2023 | Takeuchi et al. | |
| 2023/0307704 A1 | 9/2023 | Tanaka et al. | |

FOREIGN PATENT DOCUMENTS

| | | |
|---|---|---|
| WO | 2021/075243 A1 | 4/2021 |
| WO | 2021/220577 A1 | 11/2021 |
| WO | 2022/091567 A1 | 5/2022 |

OTHER PUBLICATIONS

International Search Report of PCT application No. PCT/JP2021/016247 dated Jul. 13, 2021.
English Translation of Chinese Search Report dated Oct. 9, 2023 for the related Chinese Patent Application No. 202180027982.1.
A.M. Srivastava et al., "Synthesis and Luminescence Properties Of Cs2NbOF5 AND Cs2NbOCl5 With Isolated [NbOX5]-2 (X = F-, Ci-) Octahedra", Mat. Res. Bull., vol. 26, Issue 6, Dec. 31, 1991 (Dec. 31, 1991), pp. 443-448.

* cited by examiner

METHOD FOR PRODUCING OXYHALIDE

BACKGROUND

1. Technical Field

The present invention relates to a method for producing an oxyhalide.

2. Description of the Related Art

International Publication No. 2018/025582 discloses a method for producing an oxyhalide solid electrolyte.

SUMMARY

One non-limiting and exemplary embodiment provides a method for producing an oxyhalide with high industrial productivity.

In one general aspect, the techniques disclosed here feature a producing method including heat-treating a material mixture at higher than or equal to 150° C. and lower than or equal to 450° C., wherein the material mixture contains $MX_5$ and at least one selected from the group consisting of $Li_2O_2$, $Li_2O$, and LiOH, M is at least one selected from the group consisting of Ta and Nb, and X is at least one selected from the group consisting of Cl and Br.

The present disclosure provides a method for producing an oxyhalide with high industrial productivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

The embodiments will be described below with reference to the drawings.

First Embodiment

Figure 1:
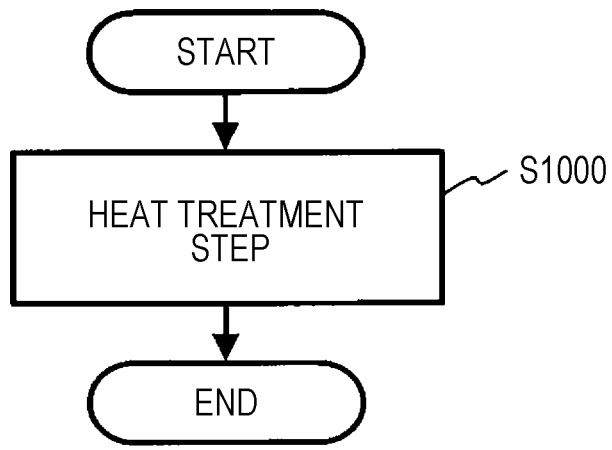
FIG. 1 is a flow chart illustrating an example of a producing method according to a first embodiment.

FIG. 1 is a flow chart illustrating an example of a producing method according to a first embodiment.

The producing method according to the first embodiment includes a heat treatment step S1000. In the heat treatment step S1000, a material mixture is heat-treated at higher than or equal to 150° C. and lower than or equal to 450° C. In this regard, the heat treatment temperature is an ambient temperature.

The material mixture heat-treated in the heat treatment step S1000 contains $MX_5$ and at least one selected from the group consisting of $Li_2O_2$, $Li_2O$, and LiOH. M is at least one selected from the group consisting of Ta and Nb. X is at least one selected from the group consisting of Cl and Br.

The producing method according to the first embodiment is a method for producing an oxyhalide with high industrial productivity. The method with high industrial productivity is a method capable of performing mass production at a low cost. That is, an oxyhalide containing Li (lithium) and one selected from the group consisting of Ta (tantalum) and Nb (niobium) can be produced by a simple method.

The producing method according to the first embodiment is not limited to using a planetary ball mill.

In the heat treatment step S1000, for example, a material mixture powder may be placed into an airtight container and heat-treated in a furnace. In such an instance, the material mixture may be maintained in a state of being heat-treated to higher than or equal to 150° C. and lower than or equal to 450° C. for greater than or equal to a predetermined time. The heat treatment time may be a time of such an extent that does not cause a compositional deviation of the heat-treated material due to, for example, vaporization of the oxyhalide. The heat treatment time of such an extent that does not cause a compositional deviation of the heat-treated material is a heat treatment time of such an extent that does not impair the ionic conductivity of the heat-treated material. The airtight container is, for example, a quartz glass container or a borosilicate glass container. The interior of the airtight container may be a vacuum or be filled with an inert gas or dry air. An example of the inert gas is helium, nitrogen, or argon. The producing method according to the first embodiment can produce an oxyhalide having an ionic conductivity of greater than or equal to 0.14 mS/cm at or around room temperature.

To produce an oxyhalide having higher ionic conductivity by a method with industrially high productivity, the material mixture may be heat-treated at higher than or equal to 200° C. in the heat treatment step S1000. For example, heat treatment may be performed at higher than or equal to 200° C. and lower than or equal to 450° C. When the heat treatment temperature is higher than or equal to 200° C., the ionic conductivity of the oxyhalide that is the heat-treated material has higher crystallinity. As a result, the ionic conductivity of the oxyhalide that is the heat-treated material can be further improved. That is, an oxyhalide solid electrolyte material having better quality can be obtained.

To produce an oxyhalide having higher ionic conductivity by a method with industrially high productivity, the material mixture may be heat-treated at lower than or equal to 400° C. in the heat treatment step S1000. For example, heat treatment may be performed at higher than or equal to 150° C. and lower than or equal to 400° C. or higher than or equal to 200° C. and lower than or equal to 400° C. The heat treatment temperature being lower than or equal to 400° C. enables the oxyhalide to be suppressed from decomposing. As a result, the ionic conductivity of the oxyhalide that is the heat-treated material can be further improved. That is, an oxyhalide solid electrolyte material having better quality can be obtained.

To produce an oxyhalide having higher ionic conductivity by a method with industrially high productivity, the material mixture may be heat-treated at lower than or equal to 350° C. in the heat treatment step S1000. For example, heat treatment may be performed at higher than or equal to 150° C. and lower than or equal to 350° C. or higher than or equal to 200° C. and lower than or equal to 350° C. The heat treatment temperature being lower than or equal to 350° C. enables the oxyhalide to be suppressed from decomposing. As a result, the ionic conductivity of the oxyhalide that is the heat-treated material can be further improved. That is, an oxyhalide solid electrolyte material having better quality can be obtained.

To produce an oxyhalide having higher ionic conductivity by a method with industrially high productivity, the material mixture may be heat-treated for greater than or equal to 30 minutes and less than or equal to 12 hours in the heat treatment step S1000. The heat treatment time being greater than or equal to 30 minutes enables the material mixture to sufficiently react. That is, at least one selected from the group consisting of $Li_2O_2$, $Li_2O$, and LiOH is allowed to sufficiently react with $MX_5$. The heat treatment time being less than or equal to 12 hours enables the oxyhalide that is the heat-treated material to be suppressed from decomposing. As a result, the ionic conductivity of the oxyhalide that is the heat-treated material can be further improved. That is, an oxyhalide solid electrolyte material having better quality can be obtained.

To produce an oxyhalide having higher ionic conductivity by a method with industrially high productivity, the material mixture may be heat-treated for greater than or equal to 3 hours and less than or equal to 12 hours in the heat treatment step S1000. The heat treatment time being greater than or equal to 3 hours enables the material mixture to more sufficiently react. That is, at least one selected from the group consisting of $Li_2O_2$, $Li_2O$, and LiOH is allowed to more sufficiently react with $MX_5$. As a result, the ionic conductivity of the oxyhalide that is the heat-treated material can be further improved. That is, an oxyhalide solid electrolyte material having better quality can be obtained.

After the heat treatment step S1000, the heat-treated material may be pulverized. In such an instance, a pulverization instrument may be used. The pulverization instrument is, for example, a mortar or a mixer.

To improve the characteristics (for example, ionic conductivity) of the oxyhalide, the material mixture may contain $Li_2O_2$ or LiOH. It is desirable that the material mixture contain $Li_2O_2$.

To improve the characteristics (for example, ionic conductivity) of the oxyhalide, the material mixture may further contain $NbOCl_3$.

To improve the characteristics (for example, ionic conductivity) of the oxyhalide, the material mixture may further contain at least one selected from the group consisting of LiF and $MeF_5$. Herein, Me is at least one selected from the group consisting of Ta and Nb.

To improve the ionic conductivity of the oxyhalide, in the material mixture, the molar ratio of the total raw material containing Li to $MX_5$ may be greater than or equal to 0.4 and less than or equal to 1. Alternatively, the molar ratio may be greater than or equal to 0.6 and less than or equal to 1. It is desirable that the molar ratio be greater than or equal to 0.6 and less than or equal to 0.8. The raw material containing Li is, for example, $Li_2O_2$, $Li_2O$, LiOH, or LiF.

To improve the ionic conductivity of the oxyhalide, X may contain Cl. It is desirable that X be Cl.

That is, the material mixture heat-treated in the heat treatment step S1000 may contain $MCl_5$ and at least one selected from the group consisting of $Li_2O_2$, $Li_2O$, and LiOH.

To produce an oxyhalide by a method with industrially high productivity, the material mixture heat-treated in the heat treatment step S1000 may contain at least one selected from the group consisting of $Li_2O_2$, $Li_2O$, and LiOH and at least one selected from the group consisting of $TaCl_5$ (tantalum chloride) and $NbCl_5$ (niobium chloride). The oxyhalide containing Li and at least one selected from the group consisting of Ta and Nb can be produced by a simple method.

Figure 2:
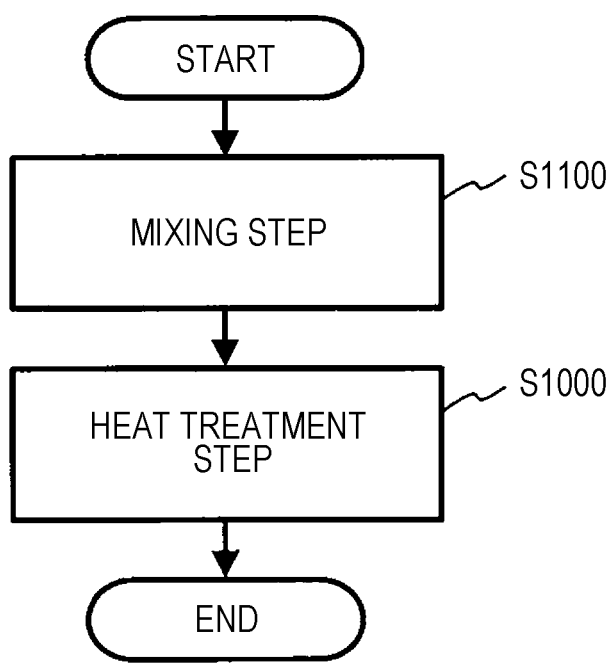
FIG. 2 is a flow chart illustrating an example of the producing method according to the first embodiment.

FIG. 2 is a flow chart illustrating an example of the producing method according to the first embodiment.

As illustrated in FIG. 2, the producing method according to the first embodiment may further include a mixing step S1100. The mixing step S1100 is performed before the heat treatment step S1000.

In the mixing step S1100, $MX_5$ and at least one selected from the group consisting of $Li_2O_2$, $Li_2O$, and LiOH, serving as raw materials of the oxyhalide, are mixed. As a result, the material mixture is obtained. That is, the material to be heat-treated in the heat treatment step S1000 is obtained.

In the mixing step S1100, $MX_5$ and at least one selected from the group consisting of $Li_2O_2$, $Li_2O$, and LiOH may be prepared and mixed so as to ensure a predetermined molar ratio.

In the mixing step S1100, $Li_2O_2$ and $TaCl_5$ may be mixed. In this regard, the molar ratio of $Li_2O_2$ to $TaCl_5$ may be greater than or equal to 0.4 and less than or equal to 1.0.

To mix the raw materials, a known mixing instrument may be used. The mixing instrument is, for example, a mortar, a blender, or a ball mill.

In the heat treatment step S1000, a powdery material mixture may be heat-treated. The powdery material mixture obtained in the mixing step S1100 may be formed into a pellet-like shape. In the heat treatment step S1000, the pellet-like material mixture may be heat-treated.

In the mixing step S1100, the material mixture may be obtained by mixing not only $MX_5$ and at least one selected from the group consisting of $Li_2O_2$, $Li_2O$, and LiOH but also other materials. For example, the material mixture may be obtained by further mixing at least one selected from the group consisting of $NbOCl_3$, LiF, and $MeF_5$. Herein, Me is at least one selected from the group consisting of Ta and Nb.

In the mixing step S1100, the material mixture may be obtained by mixing a raw material containing at least one selected from the group consisting of $Li_2O_2$, $Li_2O$, and LiOH as a main component and a raw material containing $MX_5$ as a main component. The main component denotes a component which is contained in the largest molar ratio.

Figure 3:
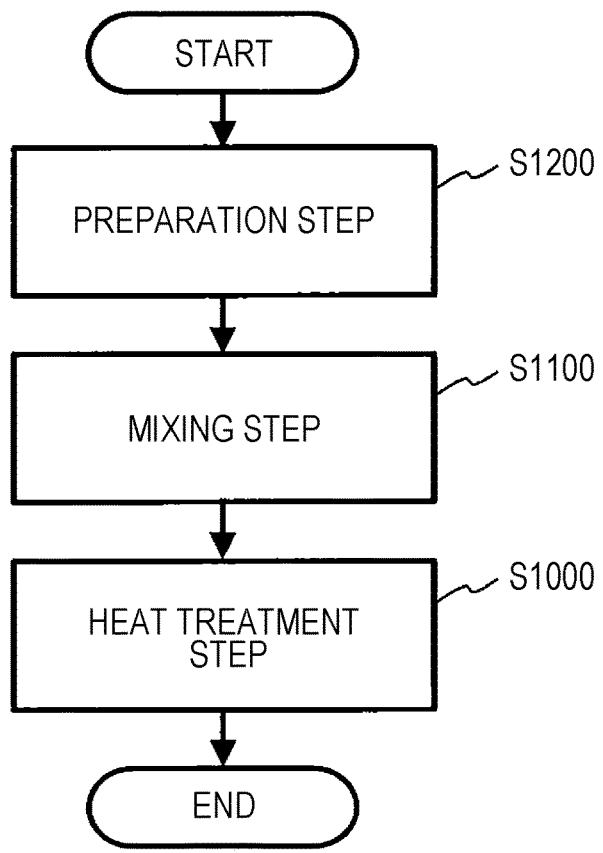
FIG. 3 is a flow chart illustrating an example of the producing method according to the first embodiment.

FIG. 3 is a flow chart illustrating an example of the producing method according to the first embodiment.

As illustrated in FIG. 3, the producing method according to the first embodiment may further include a preparation step S1200. The preparation step S1200 is performed before the mixing step S1100.

In the preparation step S1200, raw materials such as $Li_2O_2$, $Li_2O$, LiOH, and $MX_5$ are prepared. That is, the materials to be mixed in the mixing step S1100 are prepared.

In the preparation step S1200, raw materials such as $Li_2O_2$, $Li_2O$, LiOH, and $MX_5$ may be synthesized. The purity of the raw material may be greater than or equal to 99% by mass. In the preparation step S1200, known commercially available products may be used.

Dry raw materials may be prepared.

An example of the shape of the prepared raw material is crystalline, block-like, flake-like, or powdery. In the preparation step S1200, a powdery raw material may be obtained by a crystalline, block-like, or flake-like raw material being pulverized.

To improve the characteristics (for example, ionic conductivity) of the oxyhalide, at least one selected from the group consisting of $NbOCl_3$, LiF, and $MeF_5$ may be added in the preparation step S1200. Herein, Me is at least one selected from the group consisting of Ta and Nb.

The oxyhalide produced by the producing method according to the present disclosure may be used as a solid electrolyte material. The solid electrolyte material is used in, for example, an all-solid lithium ion secondary battery.

EXAMPLES

The present disclosure will be described below in more detail with reference to the examples.

The oxyhalides produced by the producing method according to the present disclosure below were evaluated as solid electrolyte materials.

Example 1

Production of Solid Electrolyte Material

In an argon atmosphere having a dew point of lower than or equal to −60° C. and an oxygen concentration of less than or equal to 0.0001% by volume (hereafter referred to as "dry argon atmosphere"), $Li_2O_2$ and $TaCl_5$, which served as raw material powders, were prepared so that the molar ratio was set to be $Li_2O_2:TaCl_5=0.8:1$. The materials were pulverized and mixed in an agate mortar. The resulting mixture was placed into a quartz glass container filled with an argon gas and heat-treated at 320° C. for 3 hours. The resulting heat-treated material was pulverized in an agate mortar. In this manner, the solid electrolyte material of Example 1 was obtained.

Evaluation of Ionic Conductivity

Figure 4:
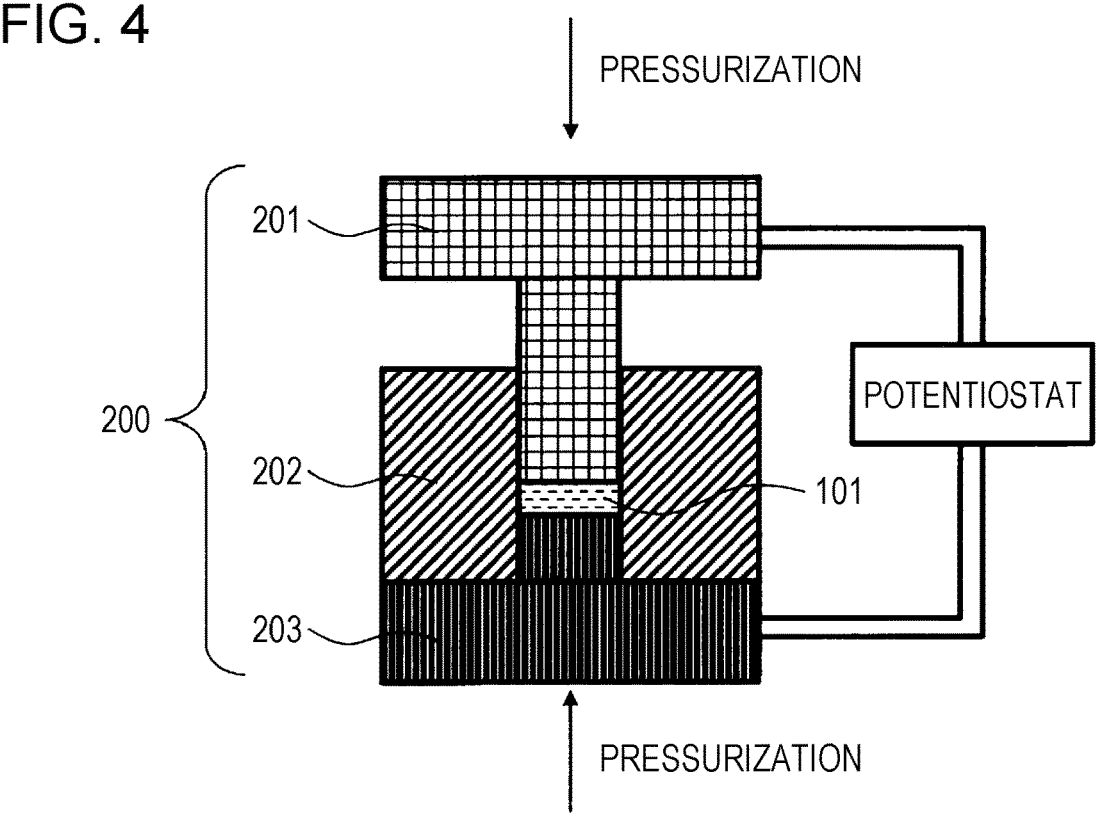
FIG. 4 is a schematic diagram illustrating a pressure forming die 200 used for evaluating the ionic conductivity of a solid electrolyte material.

FIG. 4 is a schematic diagram illustrating a pressure forming die 200 used for evaluating the ionic conductivity of a solid electrolyte material.

The pressure forming die 200 included a punch upper portion 201, a frame 202, and a punch lower portion 203. The frame 202 was formed of an insulating polycarbonate. Each of the punch upper portion 201 and the punch lower portion 203 was formed of electron-conductive stainless steel.

The ionic conductivity of the solid electrolyte material of Example 1 was measured using the pressure forming die 200 illustrated in FIG. 4 by a method described below.

In a dry atmosphere having a dew point of lower than or equal to −60° C., the interior of the pressure forming die 200 was filled with the solid electrolyte material of Example 1. A pressure of 300 MPa was applied to the solid electrolyte material of Example 1 (that is, a solid electrolyte material powder 101 in FIG. 4) by using the punch upper portion 201 and the punch lower portion 203.

The punch upper portion 201 and the punch lower portion 203 were coupled to a potentiostat (VersaSTAT4, Princeton Applied Research) incorporated with a frequency response analyzer while the pressure was applied. The punch upper portion 201 was coupled to a working electrode and a potential-measuring terminal. The punch lower portion 203 was coupled to a counter electrode and a reference electrode.

The ionic conductivity of the solid electrolyte material was measured at room temperature by an electrochemical impedance measuring method. As a result, the ionic conductivity measured at 24° C. was 6.60 mS/cm.

Examples 2 to 18 and Comparative Example 1

Production of Solid Electrolyte Material

In Examples 2 to 9, $Li_2O_2$ and $TaCl_5$, which served as raw material powders, were prepared so that the molar ratio was set to be $Li_2O_2:TaCl_5=0.8:1$.

In Example 10, $Li_2O_2$ and $TaCl_5$, which served as raw material powders, were prepared so that the molar ratio was set to be $Li_2O_2:TaCl_5=0.6:1$.

In Example 11, $Li_2O_2$ and $TaCl_5$, which served as raw material powders, were prepared so that the molar ratio was set to be $Li_2O_2:TaCl_5=0.4:1$.

In Example 12, $Li_2O_2$ and $TaCl_5$, which served as raw material powders, were prepared so that the molar ratio was set to be $Li_2O_2:TaCl_5=1:1$.

In Example 13, LiOH and $TaCl_5$, which served as raw material powders, were prepared so that the molar ratio was set to be $LiOH:TaCl_5=1:1$.

In Example 14, $Li_2O$ and $TaCl_5$, which served as raw material powders, were prepared so that the molar ratio was set to be $Li_2O:TaCl_5=1:1$.

In Example 15, $Li_2O_2$, $TaCl_5$, and $NbCl_5$, which served as raw material powders, were prepared so that the molar ratio was set to be $Li_2O_2:TaCl_5:NbCl_5=0.8:0.5:0.5$.

In Example 16, $Li_2O_2$, $TaCl_5$, and $NbCl_5$, which served as raw material powders, were prepared so that the molar ratio was set to be $Li_2O_2:TaCl_5:NbCl_5=0.8:0.3:0.7$.

In Example 17, $Li_2O_2$, $TaCl_5$, and $NbOCl_3$, which served as raw material powders, were prepared so that the molar ratio was set to be $Li_2O_2:TaCl_5:NbOCl_3=0.5:0.8:0.2$.

In Example 18, $Li_2O_2$, $TaCl_5$, and $TaF_5$, which served as raw material powders, were prepared so that the molar ratio was set to be $Li_2O_2:TaCl_5:TaF_5=0.6:0.9:0.1$.

In Comparative example 1, $Li_2O_2$ and $TaCl_5$, which served as raw material powders, were prepared so that the molar ratio was set to be $Li_2O_2:TaCl_5=0.8:1$.

The solid electrolyte materials of Examples 2 to 18 and Comparative example 1 were obtained in a manner akin to that of Example 1 except for the above, the heat treatment temperature, and the heat treatment time. The heat treatment temperature and the heat treatment time are presented in Table 1.

Evaluation of Ionic Conductivity

The ionic conductivities of the solid electrolyte materials of Examples 2 to 18 and Comparative example 1 were measured in a manner akin to that of Example 1. The measurement results are presented in Table 1.

TABLE 1

| | Raw material 1 | Raw material 2 | Raw material 3 | Molar ratio of raw material (raw material 1: raw material 2: raw material 3) | Heat treatment temperature (° C.) | Heat treatment time (hr) | Ionic conductivity (mS/cm) |
|---|---|---|---|---|---|---|---|
| Example 1 | $Li_2O_2$ | $TaCl_5$ | — | 0.8:1 | 320 | 3 | 6.60 |
| Example 2 | $Li_2O_2$ | $TaCl_5$ | — | 0.8:1 | 150 | 3 | 0.14 |
| Example 3 | $Li_2O_2$ | $TaCl_5$ | — | 0.8:1 | 200 | 3 | 3.59 |
| Example 4 | $Li_2O_2$ | $TaCl_5$ | — | 0.8:1 | 250 | 3 | 4.39 |
| Example 5 | $Li_2O_2$ | $TaCl_5$ | — | 0.8:1 | 350 | 3 | 5.42 |
| Example 6 | $Li_2O_2$ | $TaCl_5$ | — | 0.8:1 | 400 | 3 | 1.28 |

TABLE 1-continued

| | Raw material 1 | Raw material 2 | Raw material 3 | Molar ratio of raw material (raw material 1: raw material 2: raw material 3) | Heat treatment temperature (° C.) | Heat treatment time (hr) | Ionic conductivity (mS/cm) |
|---|---|---|---|---|---|---|---|
| Example 7 | $Li_2O_2$ | $TaCl_5$ | — | 0.8:1 | 450 | 3 | 0.77 |
| Example 8 | $Li_2O_2$ | $TaCl_5$ | — | 0.8:1 | 350 | 0.5 | 1.44 |
| Example 9 | $Li_2O_2$ | $TaCl_5$ | — | 0.8:1 | 350 | 12 | 3.77 |
| Example 10 | $Li_2O_2$ | $TaCl_5$ | — | 0.6:1 | 350 | 3 | 3.54 |
| Example 11 | $Li_2O_2$ | $TaCl_5$ | — | 0.4:1 | 350 | 3 | 1.03 |
| Example 12 | $Li_2O_2$ | $TaCl_5$ | — | 1:1 | 350 | 3 | 2.24 |
| Example 13 | LiOH | $TaCl_5$ | — | 1:1 | 350 | 3 | 1.05 |
| Example 14 | $LiO_2$ | $TaCl_5$ | — | 1:1 | 350 | 3 | 0.42 |
| Example 15 | $Li_2O_2$ | $TaCl_5$ | $NbCl_5$ | 0.8:0.5:0.5 | 300 | 3 | 1.18 |
| Example 16 | $Li_2O_2$ | $TaCl_5$ | $NbCl_5$ | 0.8:0.3:0.7 | 300 | 3 | 0.92 |
| Example 17 | $Li_2O_2$ | $TaCl_5$ | $NbOCl_3$ | 0.5:0.8:0.2 | 350 | 3 | 4.03 |
| Example 18 | $Li_2O_2$ | $TaCl_5$ | $TaF_5$ | 0.6:0.9:0.1 | 350 | 3 | 3.50 |
| Comparative example 1 | $Li_2O_2$ | $TaCl_5$ | — | 0.8:1 | 100 | 3 | 0.067 |

CONSIDERATION

As is clear from Examples 1 to 18, when the heat treatment temperature is higher than or equal to 150° C. and lower than or equal to 450° C., the resulting oxyhalide has high ionic conductivity of greater than or equal to 0.14 mS/cm at or around room temperature. On the other hand, as is clear from Comparative example 1, when the heat treatment temperature is 100° C., the oxyhalide has low ionic conductivity of 0.067 mS/cm at or around room temperature. It is conjectured that when the heat treatment temperature is 100° C., a solid phase reaction does not sufficiently proceed.

As is clear from comparisons of Examples 1 and 3 to 5 with Examples 2, 6, and 7, when the heat treatment temperature is higher than or equal to 200° C. and lower than or equal to 350° C., the oxyhalide has higher ionic conductivity. As is clear from comparisons of Examples 1, 4, and 5 with Example 3, when the heat treatment temperature is higher than or equal to 250° C. and lower than or equal to 350° C., the ionic conductivity of the oxyhalide further increases. It is conjectured that the oxyhalide has high crystallinity due to being heat-treated at such a heat treatment temperature.

As is clear from comparisons of Examples 5 and 9 with Example 8, when the heat treatment time is greater than or equal to 3 hours and less than or equal to 12 hours, the ionic conductivity of the oxyhalide further increases.

As is clear from comparisons of Examples 12 and 13 with Example 14, when the raw material containing Li is $Li_2O_2$ or LiOH rather than $Li_2O$, the oxyhalide has higher ionic conductivity. As is clear from comparisons of Example 12 with Example 13, when the raw material containing Li is $Li_2O_2$ rather than LiOH, the oxyhalide has still higher ionic conductivity.

As is clear from comparisons of Examples 5, 10, and 12 with Example 11, when the material to be heat-treated is $Li_2O_2$ and $TaCl_5$, the molar ratio of $Li_2O_2$ to $TaCl_5$ being greater than or equal to 0.6 and less than or equal to 1 increases the ionic conductivity of the oxyhalide. As is clear from comparisons of Examples 5 and 10 with Example 12, the molar ratio of $Li_2O_2$ to $TaCl_5$ being greater than or equal to 0.6 and less than or equal to 0.8 further increases the ionic conductivity of the oxyhalide.

As is clear from comparisons of Examples 15 with Example 16, when the oxyhalide contains Ta and Nb, the molar ratio of Ta to Nb being greater than or equal to 1 increases the ionic conductivity of the oxyhalide.

As is clear from Example 18, the oxyhalide has high ionic conductivity even when containing F.

As described above, the oxyhalide produced by the producing method according to the present disclosure has high lithium ion conductivity. Further, the producing method according to the present disclosure is a simple method and is a method with high industrial productivity.

The producing method according to the present disclosure may be exploited as, for example, a method for producing a solid electrolyte material. The solid electrolyte material produced by the producing method according to the present disclosure may be exploited in, for example, an all-solid lithium ion secondary battery.

What is claimed is:

1. A method for producing an oxyhalide comprising:
   heat-treating a dry powder material mixture at higher than or equal to 150° C. and lower than or equal to 450° C. to obtain the oxyhalide, wherein
   the dry powder material mixture that is heat-treated contains dry powdery raw materials of $MX_5$ and at least one selected from the group consisting of $Li_2O_2$, $Li_2O$, and LiOH,
   M is at least one selected from the group consisting of Ta and Nb, and
   X is at least one selected from the group consisting of Cl and Br.

2. The method for producing an oxyhalide according to claim 1,
   wherein X contains Cl.

3. The method for producing an oxyhalide according to claim 1,
   wherein the dry powder material mixture is heat-treated at higher than or equal to 200° C. in the heat-treating.

4. The method for producing an oxyhalide according to claim 1, wherein the dry powder material mixture is heat-treated at lower than or equal to 400° C. in the heat-treating.

5. The method for producing an oxyhalide according to claim 1,
wherein the dry powder material mixture is fired for greater than or equal to 30 minutes and less than or equal to 12 hours in the heat-treating.

6. The method for producing an oxyhalide according to claim 1,
wherein the dry powder material mixture further contains $NbOCl_3$.

7. The method for producing an oxyhalide according to claim 1,
wherein the dry powder material mixture further contains at least one selected from the group consisting of LiF and $MeF_5$, and
Me is at least one selected from the group consisting of Ta and Nb.

8. A method for producing an oxyhalide comprising:
heat-treating a material mixture at higher than or equal to 150° C. and lower than or equal to 450° C.,
wherein the material mixture contains $NbOCl_3$, $MX_5$ and at least one selected from the group consisting of $Li_2O_2$, $Li_2O$, and LiOH,
M is at least one selected from the group consisting of Ta and Nb, and
X is at least one selected from the group consisting of Cl and Br.

9. The method for producing an oxyhalide according to claim 8,
wherein X contains Cl.

10. The method for producing an oxyhalide according to claim 8,
wherein the material mixture is heat-treated at higher than or equal to 200° C. in the heat-treating.

11. The method for producing an oxyhalide according to claim 8,
wherein the material mixture is heat-treated at lower than or equal to 400° C. in the heat-treating.

12. The method for producing an oxyhalide according to claim 8,
wherein the material mixture is fired for greater than or equal to 30 minutes and less than or equal to 12 hours in the heat-treating.

13. The method for producing an oxyhalide according to claim 8,
wherein the material mixture further contains at least one selected from the group consisting of LiF and $MeF_5$, and
Me is at least one selected from the group consisting of Ta and Nb.

* * * * *